Jan. 10, 1967 P. E. HYDE 3,297,972
LIQUID RHEOSTAT
Original Filed Dec. 16, 1963
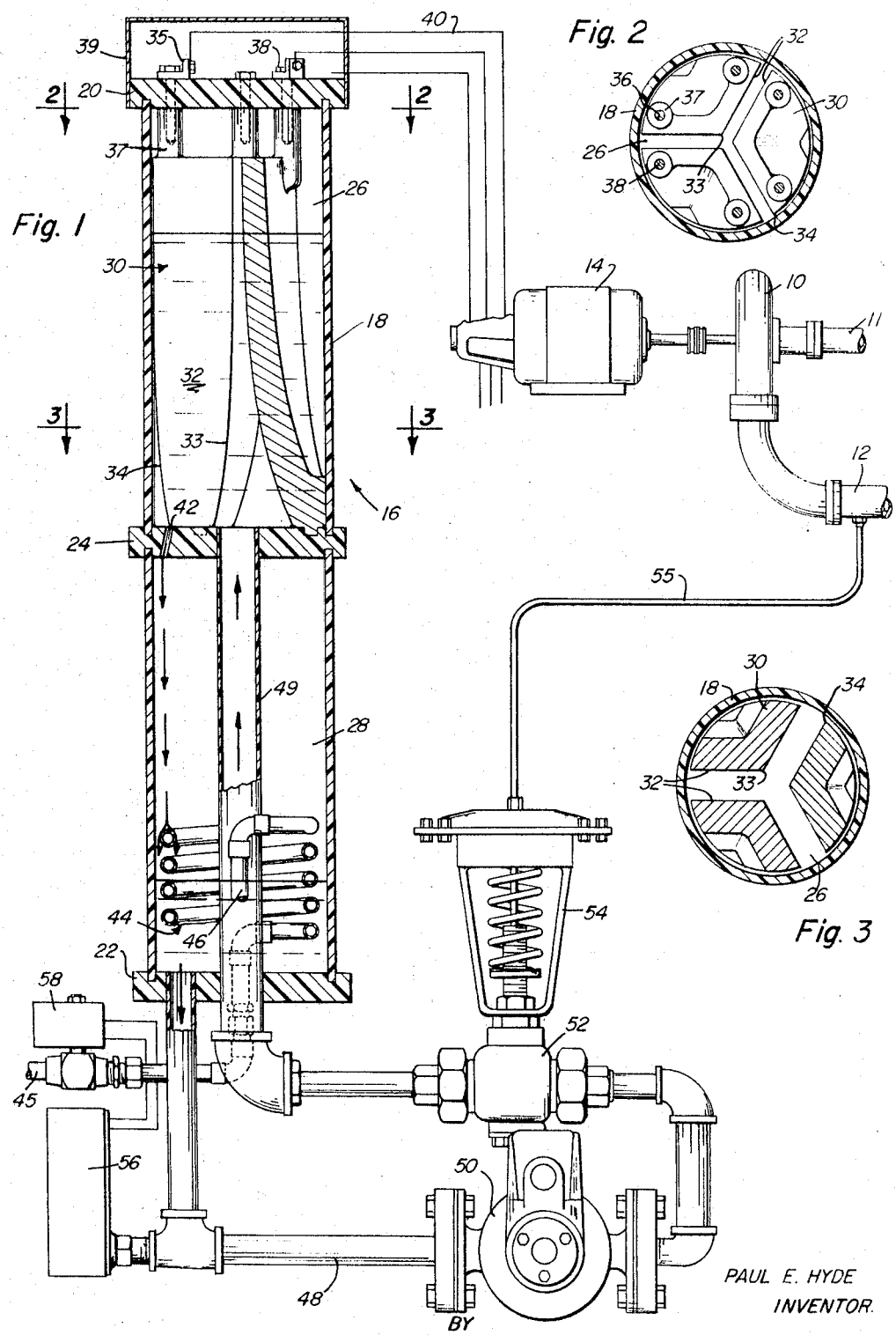
PAUL E. HYDE
INVENTOR.
BY
BUCKHORN, BLORE, KLARQUIST & SPARKMAN
ATTORNEYS United States Patent Office 3,297,972
Patented Jan. 10, 1967

3,297,972
LIQUID RHEOSTAT
Paul E. Hyde, Corvallis, Oreg., assignor to Flomatcher Co., Inc., Corvallis, Oreg., a corporation of Oregon
Original application Dec. 16, 1963, Ser. No. 330,865, now Patent No. 3,263,616, dated Aug. 2, 1966. Divided and this application Jan. 17, 1966, Ser. No. 520,953
5 Claims. (Cl. 338—86)

This is a division of my copending application, Serial No. 330,865, filed December 16, 1963, and entitled "Liquid Rheostat", and issued on August 2, 1966, as Patent No. 3,263,616.

The present invention relates to an arrangement for controlling the speed of an electric motor and more particularly to a recirculating liquid rheostat for controlling the speed of a motor in response to variations in demand on such motor by the system in which the motor operates.

A primary object of the present invention is to provide a new and improved recirculating liquid rheostat for controlling the speed of an electric motor.

A more specific object of the invention is to provide a new and improved liquid rheostat in which the flow rate of electrolyte may be accurately controlled and easily determined.

Another object of the invention is to provide a new and improved liquid rheostat in which the electrolyte is cooled regardless of the flow rate of electrolyte through the systems.

Still another object of the invention is to provide a new and improved liquid rheostat control system of unusual compactness and having a simplified arrangement of elements for ease in installation and reliable operation.

A further object of the invention is to provide a new and improved electrode assembly for a liquid rheostat, which provides for a uniform distribution of current across the opposed faces of the electrodes together with a logarithmic variation in resistance relative to the height of liquid in the rheostat.

In furtherance of the above objects and in accordance with the illustrated embodiment of the invention, the rheostat includes a vertical tubular housing partitioned transversely into an upper, electrode chamber with electrodes therein connected to a variable speed motor in a system subjecting the motor to varying demands, and a lower, electrolyte chamber, with a drain orifice of predetermined, fixed size provided between the two chambers. A cooling coil within the lower chamber is positioned to cool electrolyte as the latter descends by gravity flow from the upper chamber to the base of the lower chamber. A recirculation line connects the upper and lower chambers and includes an external section in communication with the base of the lower chamber and an internal section which extends coaxially through the lower chamber into communication with the base of the upper chamber. A circulation pump in the external section of the recirculation line returns electrolyte from the lower to the upper chamber, and a control valve means in the line on the discharge side of the pump regulates the flow rate of electrolyte through the line in response to the varying demands of the system. The valve means is controlled so that an increase in demand in the system results in an increased flow rate of electrolyte through the recirculation line into the electrode chamber, thereby raising the level of electrolyte and thus reducing resistance in such chamber whereby the speed of the motor is increased. A reduced demand in the system has the converse effect, increasing resistance in the electrode chamber and thereby reducing motor speed.

The foregoing and other objects and advantages of the present invention will be more readily ascertained from inspection of the following specification taken in connection with the accompanying drawing wherein like numerals refer to like parts throughout, while the features of novelty will be more distinctly pointed out in the appended claims.

In the drawings, FIG. 1 is a side elevational view of a liquid rheostat in accordance with the invention showing portions thereof in section for clarity, and including a diagrammatic representation of a typical fluid system incorporating the rheostat. FIG. 2 is a cross-sectional view through the electrode chamber taken along the line 2—2 of FIG. 1; and FIG. 3 is a cross-sectional view taken along the line 3—3 of FIG. 1.

With reference to FIG. 1, a typical fluid system in which the invention may be used to advantage includes a pump 10 having an intake line 11 connected to a suitable supply source and a discharge line 12 through which it may be desired to distribute fluid at a constant pressure. A variable speed electric motor 14, such as, for example, a wound rotor induction type, is provided to drive the pump 10 at a speed in accordance with the demands of the system. The illustrative system might be utilized, for example, to distribute water to multiple users at a constant pressure regardless of the varying demands for water from the system.

In accordance with the invention a liquid rheostat, indicated generally at 16, is connected across the rotor windings of the motor 14 in a well-known manner, whereby the speed of the motor may be varied by varying the liquid level and thus the resistance in the electrode chamber of such rheostat. The rheostat 16 includes a columnar, generally vertically disposed housing 18 including a top wall 20, and a bottom wall, or base, 22. The housing may be constructed of, for example, reinforced plastic or any other suitable dielectric material and may be of any cross-sectional shape, although a cylindrical shape is preferred for most uses. The housing is divided transversely by a partition 24 into an upper, electrode chamber 26 and a lower, electrolyte reservoir 28.

Fixedly mounted within the electrode chamber 26 are three electrodes 30 which extend generally vertically from the partition 24 to the top wall 20.

As most clearly shown in FIGS. 2 and 3, three identical electrodes 30 are symmetrically arranged about the vertical axis of the chamber 18 and each electrode is also symmetrical about its longitudinal median plane. Each electrode includes a pair of wings defining identical, longitudinally curvilinear outer surfaces 32 which intersect along a corner 33 at an included angle of about 120° to define a generally wedge-shaped electrode body, with each surface 32 decreasing in width from its upper end to its lower end. Each surface 32 of one electrode faces a corresponding surface 32 of an adjacent electrode, and because of their curvilinear nature, the facing surfaces 32 diverge gradually but at an ever-increasing rate from the upper portions to the lower portions of the electrodes. Preferably the surfaces 32 follow a logarithmic curve so that the distance between facing surfaces increases logarithmically in a downward direction. Thus, with a variation in the level of electrolyte in the chamber 26 the resistance in the rotor circuit of the motor 14 will vary logarithmically also, giving more immediate and effective control of pressure changes in the controlled system.

As viewed in a vertical plane, the upper portions of facing surfaces 32 are parallel or very nearly so to minimize slip of a motor controlled thereby when the motor is operating at substantially full speed. As viewed in horizontal cross section (FIGS. 2 and 3), the facing surfaces 32 of adjacent electrodes are flat and parallel to one another whereby the perpendicular distance between such surfaces 32 remains constant from the inner corner 33 to the radially outer edge 34 in any given cross section. Thus at any electrolyte level current distribution is substantially uniform across the faces of the electrodes from the inner corner 33 to the outer edge 34 of each, thereby minimizing erosion of the electrodes due to high current concentrations.

Terminals 35 are connected through the top wall 20 into suitable bores 36 in the upper, projecting end portions 37 of the electrodes by suitable current conducting pins 38. A protective cover 39 preferably extends over the terminals which may be suitably connected by leads 40 to the rotor windings of the motor 14.

The electrode chamber 26 is filled with electrolyte to a level which varies dependent upon the desired speed of the motor 14, the higher such level, the lower the resistance and hence the higher the speed of the motor. Means are provided for varying the level of electrolyte in the electrode chamber. These means include one or more drain orifices 42 of fixed diameter in the partition 24, through which electrolyte drains by gravity flow from the electrode chamber and discharges into the upper end of the electrolyte reservoir 28. A cooling means is also provided for cooling the electrolyte after it drains from the electrode chamber 30. The illustrated means includes a cooling coil 44 arranged coaxially within the electrolyte reservoir 28 for conducting a suitable coolant, such as cold water, through the reservoir. The coil is connected to an inflow line 45 and an outflow line 46 which extend through the base 22 to a suitable coolant supply source. The orifice 42 opens into the reservoir 28 at a position vertically above the individual turns of the coil 44 whereby electrolyte descending from the orifice to the bottom of the reservoir necessarily passes over the turns of the coil. Thus electrolyte at a high temperature discharged from the electrode chamber is cooled immediately after leaving such chamber regardless of whether electrolyte in the lower reservoir 28 is at a depth sufficient to cover the cooling coils 44.

A recirculation line connects the electrolyte reservoir 28 and the electrode chamber 26 for returning electrolyte to the latter and includes an external line section 48 which extends in a loop from a position adjacent the periphery of the base 22 of the reservoir 28 outside the housing 18 and thence back to the center of the base 22. An internal line section 49 of the same line is a continuation of the external line section and extends upwardly, coaxially through the base 22, reservoir 28, coil 44 and partition 24 into communication with the upper, electrode chamber 26.

A constant speed circulation pump 50 is installed in the external loop portion 48 of the recirculation line for pumping electrolyte from the reservoir 28 to the electrode chamber 26. Control valve means for regulating the rate of flow of electrolyte from the reservoir 28 to the electrode chamber 26 and thus the level of electrolyte in the upper chamber in response to variations in demand on the pump 10 is provided in the external line section 28 on the discharge side of the circulation pump 50. Such means includes a valve 52 and an associated pressure responsive valve-operating means 54 operatively connected by a suitable line 55 to the discharge line 12 for sensing changes in fluid pressure in the pump discharge line 12 and regulating the flow of fluid through the valve 52 in response to such changes.

The valve-operating means 54 may be, for example, the pressure-sensitive diaphragm type valve control device shown, which is of a standard manufacture well known in the art, and which is mounted directly on the valve 52, although other valve-operating means may be used which may be mounted remotely with respect to the valve 52 and connected to the latter by suitable connecting means.

An important advantage in providing the control valve 52 in the recirculation line and specifically on the discharge side of the pump 50 is that the highest fluid pressures are developed in this portion of the electrolyte circuit whereby a relatively small control valve can be used to regulate the level of electrolyte in the electrode chamber. Also the exact flow of electrolyte through the system can be easily determined and accurately controlled with the control valve in this position since the flow will always be a function only of the depth of electrolyte in the electrode chamber and the size of the orifices 42.

It is also desirable to include a shut-off valve means in the coolant circuit and temperature responsive valve-operating means in the electrolyte circuit whereby the circulation of coolant through the cooling coil 44 occurs only when the temperature of the electrolyte in the system exceeds a predetermined desired level. In the illustrated embodiment of FIG. 1, such means include a temperature-responsive switch 56 in the external loop 48 of the recirculation line, which is operatively connected to a solenoid valve 58 in the inflow line portion 45 of the coolant circuit, so as to actuate the valve 58 and thereby permit coolant to flow through the cooling coil 44 when the temperature of the electrolyte in the recirculation line exceeds the desired predetermined upper limit.

In operation, the control valve 52 and valve-operating means 54 are adjusted so that when the fluid in the discharged line 12 is at a desired, constant pressure the rate of flow of electrolyte into the electrode chamber 26 equals the rate of outflow from such chamber, whereby the electrolyte level therein remains constant. However, when fluid pressure in the discharge line 12 rises, the change is sensed by the valve-operating means 54, which in response closes the control valve 52 enough to reduce the electrolyte inflow rate below the outflow rate of electrolyte through the orifice 42, resulting in a lowering of the level of electrolyte in the chamber and a consequential increase in resistance in the rotor of the electric motor 14. This, of course, reduces the speed of the motor, and thus the pump 10 which, in turn, reduces the pressure in the discharge line 12. Conversely, when pressure in the discharge line 12 drops, the reverse occurs to raise the level of electrolyte in the chamber 26, lower resistance and increase the speed of the motor 14 and pump 10.

Having illustrated and described a preferred embodiment of the invention, it should be apparent to those skilled in the art that the invention permits of modification in arrangement and detail. I claim as my invention all such modifications as come within the true spirit and scope of the following claims.

I claim:

1. In a liquid rheostat:
   (a) a housing, including an electrode chamber for holding an electrolyte,
   (b) at least two electrodes mounted vertically in said chamber,
   (c) means for connecting the electrodes to a source of electrical power to cause current flow therebetween through the electrolyte in the chamber,
   each of said electrodes within said chamber having upper and lower end portions and an outer surface facing and directly opposed to a corresponding outer surface of each of the other electrodes within said chamber,
   (d) the distance between said facing surfaces of all said electrodes increasing progressively and at an increasing rate from said upper end portions to said lower end portions,
   (e) the distance between said facing surfaces, as viewed in any horizontal cross section through said chamber, being constant from one edge to the other edge thereof.

2. In a liquid rheostat:
   (a) a housing, including an electrode chamber for holding an electrolyte,
   (b) a plurality of elongate, vertically disposed electrodes mounted in said chamber,
   means for connecting the electrodes to a source of electrical power to cause current to flow therebetween through the electrolyte in the chamber, (c) each of said electrodes including an upper end portion, a lower end portion and a pair of outer surfaces extending between said end portions, (d) each of said outer surfaces being longitudinally curved and facing a corresponding longitudinally curved said outer surface on an adjacent one of said electrodes, (e) the facing ones of said outer surfaces curving away from one another in a direction downwardly from said upper end portion to said lower end portion, (f) said facing surfaces, in any horizontal cross section through said chamber, being spaced a constant distance from one another throughout the widths of said surfaces in such cross section.

3. An electrode for a liquid rheostat comprising:

(a) an elongate and electrically conductive electrode body, including upper and lower end portions and terminal means for connecting the electrode body to a source of electrical power, (b) said body being wedge-shaped in transverse cross section and symmetrical about a longitudinal median plane, (c) said body including a pair of intersecting longitudinally curvilinear but transversely flat outer surfaces, (d) each of said curvilinear surfaces defining a logarithmic curve increasing progressively in curvature from said upper end portion to said lower end portion, (e) said electrode being mounted vertically within an electrolyte chamber when in its operative position.

4. An electrode for a liquid rheostat comprising:

(a) an electrically conductive electrode body including an upper end, a lower end, a pair of outer surfaces extending between said ends and terminal means for connecting the electrode body to a source of electrical power, said body being wedge-shaped in transverse horizontal cross section and being elongate and vertically positioned when in its operative position, (b) said outer surfaces intersecting at an included angle of less than 180°, and both said surfaces being longitudinally curvilinear, (c) the intersection of said outer surfaces defining a longitudinally curved corner portion, (d) said outer surfaces being symmetrical about a longitudinal median plane of said electrode passing through said intersection, (e) said outer surfaces diminishing in width from said upper end to said lower end.

5. In a liquid rheostat:

a housing, including an electrode chamber for holding an electrolyte, liquid electrolyte in said chamber, means for varying the height of the electrolyte in said electrode chamber, a plurality of at least three elongate vertically disposed electrodes mounted in said chamber, means for connecting the electrodes to a source of electrical power to cause current to flow therebetween through the electrolyte in said chamber, said electrodes being symmetrically arranged about a common vertical axis within said chamber, each of said electrodes including an upper end portion, a lower end portion and a pair of outer surfaces extending between said end portions, both of the pair of outer surfaces of each of said electrodes being longitudinally curvilinear and transversely flat and facing a corresponding one of said outer surfaces on an adjacent one of said electrodes, the facing ones of said outer surfaces of adjacent electrodes curving away from one another in a direction downwardly from the upper end portions thereof to said lower end portions thereof, each said longitudinally curvilinear surface of each electrode defining a logarithmic curve increasing tin curvature from the upper to the lower end portion of the electrode, said outer facing surfaces, in any horizontal cross section through said chamber, being spaced a constant distance from one another throughout the widths of said surfaces in each such cross section.

References Cited by the Examiner

UNITED STATES PATENTS

| 515,241 | 2/1894 | Lyon | 338—84 |
|---|---|---|---|
| 1,492,430 | 4/1924 | Crossland | 338—85 |
| 1,885,373 | 11/1932 | Planche | 338—86 X |
| 3,246,276 | 4/1966 | Miehe | 338—86 |

FOREIGN PATENTS 879,850  12/1942  France.

ANTHONY BARTIS, *Primary Examiner.*